(12) United States Patent
Jung

(10) Patent No.: US 7,406,059 B2
(45) Date of Patent: Jul. 29, 2008

(54) SYSTEM AND METHOD FOR SERVING SHORT MESSAGE IN HIGH RATE PACKET DATA SYSTEM

(75) Inventor: Ji A. Jung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 962 days.

(21) Appl. No.: 10/677,383

(22) Filed: Oct. 3, 2003

(65) Prior Publication Data
US 2004/0090951 A1    May 13, 2004

(30) Foreign Application Priority Data
Oct. 10, 2002   (KR) ................. 10-2002-0061692

(51) Int. Cl.
*H04Q 7/00* (2006.01)
(52) U.S. Cl. .................... 370/328; 370/338
(58) Field of Classification Search .............. None
See application file for complete search history.

(56) References Cited

U.S. PATENT DOCUMENTS

| | | | |
|---|---|---|---|
| 7,043,249 B2* | 5/2006 | Sayeedi | 455/445 |
| 7,103,662 B2* | 9/2006 | Ray et al. | 709/225 |
| 7,154,868 B1* | 12/2006 | Sharma et al. | 370/331 |
| 2003/0016639 A1* | 1/2003 | Kransmo et al. | 370/335 |

* cited by examiner

*Primary Examiner*—Chau Nguyen
*Assistant Examiner*—Kenneth R Hartmann, II
(74) *Attorney, Agent, or Firm*—Ked & Associates, LLP

(57) ABSTRACT

A system and method for serving short messages in high rate packet data system for transmitting short messages to a predetermined terminal by registering location and state information of the terminal and using the registered information is disclosed. The system includes a short message service center for general short message transmission, a location and information management server for registering and managing location and state information of the terminal, and providing the information to the short message service center, a packet data service node for reporting the state information of the terminal to the Location and Information Management Server and a PCF for reporting the location information of the terminal to the Location Information Management Server, and providing call state change information of the corresponding terminal to the packet data service node.

13 Claims, 9 Drawing Sheets

SYSTEM AND METHOD FOR SERVING SHORT MESSAGE IN HIGH RATE PACKET DATA SYSTEM

CROSS-REFERENCE TO RELATED APPLICATIONS

This application claims the benefit of Korean Application No. P2002-61692, filed on Oct. 10, 2002, which is hereby incorporated by reference as if fully set forth herein.

BACKGROUND OF THE INVENTION

1. Field of the Invention

The present invention relates to a system and method for serving short message in high rate packet data system, and more particularly, to a system and method for serving short message in high rate packet data system to transmit short message to a HRPD terminal using location and state information of a corresponding registered terminal.

2. Discussion of the Related Art

A CDMA mobile communication system based on an IS-95A standard was originally devised for voice communications between users, but changing for high rate data service.

Although 14.4 Kbps data service is available under the IS-95A standard, IS-95B and IS-95C (IS-2000), upper version of the IS-95A, are introduced for basic data service and high rate data service while remaining capability with the IS-95A.

HRPD (High Rate Packet Data) system, one of IS-2000 system, is a new packet wireless data transmission technology devised by Qualcomm using CDMA (Code Division Multiple Access), and serves the data transmission at maximum transmitting rate of 2.4 Mbps in one direction and at maximum transmitting rate of 307.2 kbps in inverse direction. HRPD is called HDR (High Data Rate) or 1xEV-DO (1xEvolution Data Only).

SMS (Short message service) is a full duplex wireless calling service based on a standard of a GSM (global system for mobile communications), and transmits data at rate of maximum 150 bytes between terminals. SMS exchanges SM (Short Message) including texts and/or numbers between terminals or networks, and serves for short message transmission, urgent message indication, dates and time record, and message recognition.

Meanwhile, there was no such technology for serving short messages in HRPD system in the past, but IS-637-A is defined as a standard for serving the short message using IS 2000. Hereinafter, structure of a conventional short message service system in IS-2000 system will be described referring to FIG. 1.

FIG. 1 is a block diagram showing the conventional short message service system in IS-2000 system. The conventional short message service system includes a MS (Mobile Station) 11, a BTS (Base Transceiver Subsystem) 12, a BSC (Base Station Subsystem) 13, a MSC (Mobile Switching Center) 14, a SMC (Short Message Center) 15, a SMS Server (Short Message Service Server) 16, and a HLR (Home Location Register) 17. The MS 11 is a terminal having software for serving short message. The BTS 12 is a base station. The BSC 13 is a control station. The MSC 14 is a switchboard. The SMC 15 is a short message service center for assigning a channel of short message. The SMS server 16 is a short message service server for maintaining short message users, receiving short message service requests from the users, and transmitting the requests to the SMC 15. The HLR 17 is a home location register.

Hereinafter, a method for serving short message in a conventional IS-2000 system on a short message system in the conventional IS-2000 system structured as aforementioned.

First, the first MS 11 transmits the short message to the BTS 12 for providing the short message to the second MS 11', and the BTS 12 transmits the message to the MSC 14 through the BSC 13.

The MSC 14, if the message is interpreted as a short message, transmits the corresponding short message to the SMC 15, and the SMC 15 decides to which the message be delivered referring to the telephone number of destination in the user information at HLR 17, and transmits the corresponding short message to the second MS 11' whereto the short message is supposed to be delivered. In this case, the MSC 14 transmits the short message to the SMS server 16 for serving additional service of interlocking outside network, e.g., Internet.

Meanwhile, the SMS server 16 receives the short message service request from the users through the MS 11, and transmits the short message to the SMC 15 for serving the short message.

In this way, there was a standard (IS-637-A) for defining the short message service in IS-2000 system in the past, but no standard for defining the short message service in HRPD system. Therefore, there was a problem that the short message service in HRPD system could not be provided.

SUMMARY OF THE INVENTION

Accordingly, the present invention is directed to a system and method for serving short message in high rate packet data system that substantially obviates one or more problems due to limitations and disadvantages of the related art.

An object of the present invention is to provide a method for serving short messages in high rate packet data system (HRPD) by registering location and state information of a terminal to a server, and transmitting the short message to a predetermined HRPD terminal using the corresponding registered information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the method for serving the short message in HRPD system includes a SMSC (Short Message Service Center) for mainly performing the short message transmission; a LIMS (Location and Info. Management Server) for registering and managing location and state information of the terminal, and providing the short message to the SMSC; a PDSN (Packet Data Service Node) for reporting the state information of the terminal to the LIMS; and a PCF (Packet Control Function) for reporting the location information to the LIMS, and providing call state change information to the corresponding terminal.

In another aspect of the present invention, a method of transmitting short messages from the short message entity to the terminal for serving short message in high rate packet data system includes the steps of receiving and registering information of the terminal, and transmitting the short message to the terminal using registered information of the terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
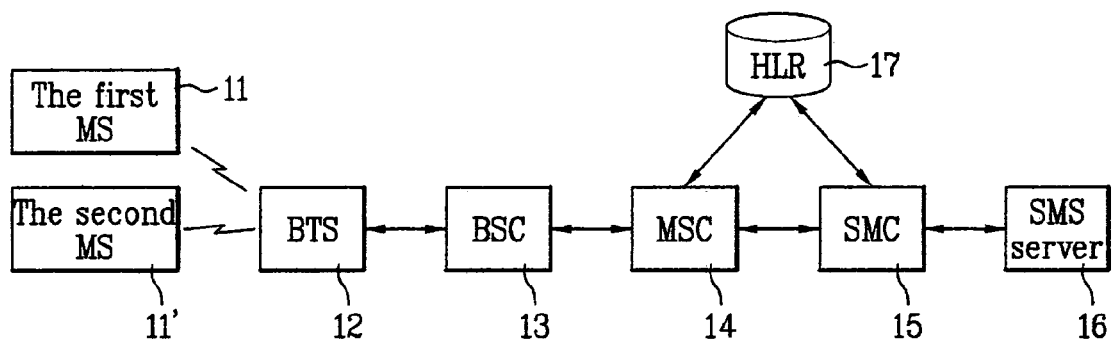
FIG. 1 is a block diagram illustrating a system for serving short message in conventional IS-2000 system.
Figure 2:
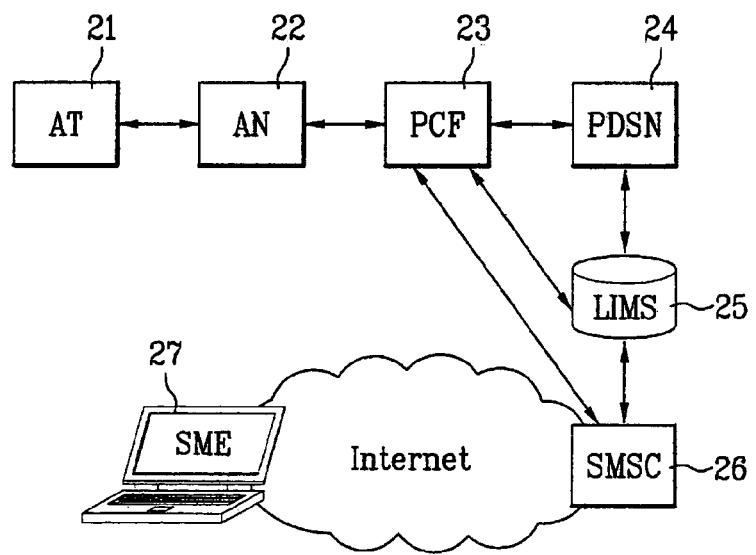
FIG. 2 is a block diagram illustrating a system for serving short message in HRPD system in accordance with a preferred embodiment of the present invention.

Initially, a system for serving short message in high rate packet data system in accordance with a preferred embodiment of the present invention will be explained referring to FIG. 2. FIG. 2 is a block diagram illustrating a system for serving short message in high rate packet data system in accordance with a preferred embodiment of the present invention.

The system for serving short message in high rate packet data system in accordance with a preferred embodiment of the present invention includes a AT (Access Terminal) 21, a AN (Access Network) 22, a PCF (Packet Control Function) 23, a PDSN (Packet Data Serving Node) 24, a LIMS (Location Info. Management Server) 25, a SMSC (Short Message Service Center) 26, and a SME (Short Message Entity) 27. The AT 21, AN 22, PCF 23, PDSN 24 and SME 27 are basic structure of a conventional HRPD system for packet wireless data service.

The AT 21 is a terminal having an IMSI (International Mobile Station Identity) for serving short message. The AT 21 receives short message using traffic channel or control channel (a signaling path), and outputs the message.

The SMSC (Short Message Service Center) 26 takes primary charges for receiving requests for short message service from the SME 27, and transmitting the short message to AT 21 through the AN 22.

The LIMS 25 is an information management server registering and managing location and state information of the AT 21, receiving requests for the registration information of the corresponding AT 21 from the SMSC 26, and providing registered location and state information of the corresponding AT 21 to the SMSC 26. One LIMS 25 can be provided in the center of a network, or a plurality of the LIMS 25 can be dispersed. The LIMS 25 manages an IP address allocated from the PDSN 24 and the IP address of the PCF 23 for the session opened AT 21.

The PDSN 24 (packet data serving nod) reports state information of the AT 21 to the LIMS 25, helps the AT 21 receive short message service by providing PPP connection with the corresponding AT 21, and provides R-P interface with the PCF 23 (The Interface between the Radio Network (specifically the PCF 23) and PDSN 24).

The PCF 23 is a packet controller for reporting location information of the AT 21 to the LIMS 25 and providing state change information (Active, Dormant, Idle) of the corresponding AT 21 to the PDSN 24. Particularly, a SC/MM function member (not shown) in the corresponding PCF 23 performs HRPD session control function and Mobility function. The PCF 23 performs UDP/IP (User Datagram Protocol/Internet Protocol) communication with the LIMS 25.

The AN 22 is an access network for receiving short messages from the PCF 23 and transmitting to the AT 21, transmitting the corresponding short message to the AT 21 using traffic channel or control channel by providing interface between the AT 21 and the packet data network.

Figure 3:
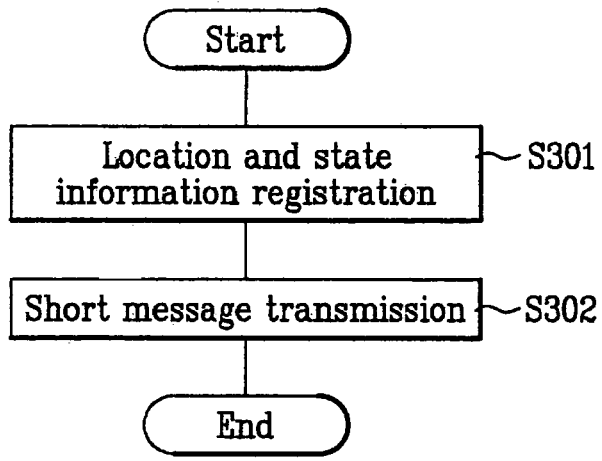
FIG. 3 is a diagram illustrating an order of method for serving short message in HRPD system.

Hereinafter, a method for transmitting short messages in high rate packet data system according to a preferred embodiment of the present invention referring to FIG. 3. FIG. 3 is a method for serving short message in high rate packet data system in accordance with the preferred embodiment. In the preferred embodiment, transmitting messages from the SME 27 to the AT 21 having a predetermined IMSI will be described.

Initially, the LIMS 25 registers location and state information of the corresponding AT 21 by receiving location information of the AT 21 from the PCF 23 and state information from the PDSN 24. The SMSC 26 receives a request for serving short messages from the SME 27 to the AT 21, and transmits the corresponding short message to the AT 21 using the location and state information of the AT 21, which is registered in the LIMS 25.

Figure 4:
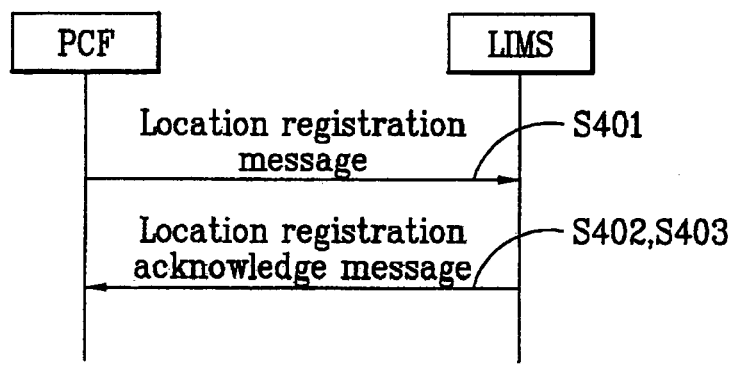
FIG. 4 is a flow diagram illustrating registration process of location information in FIG. 3.

Hereinafter, location information registration process among the location and state information registration process (S301) will be described referring to FIG. 4. FIG. 4 is a flow diagram showing the location information registration process in FIG. 3.

The PCF 23 loads location information of the corresponding AT 21 on a location information registration message and transmits to the corresponding LIMS 25 for reporting location information of the corresponding AT 21 to the LIMS 25 according to the session change case of the AT 21. The session change case of the AT 21 is divided into an open case when the session between the corresponding AT 21 and the PCF 23 is open, a handoff case, and a close case. The location registration message includes an IMSI of the AT 21, a session change case (open, handoff, close) of the AT 21, and an IP address of the PCF 23. The location registration message, in which another PCF 23 reports that the AT 21 is handoff when the AT 21 is handoff to another PCF 23, is transmitted to the LIMS 25.

The LIMS 25 receives the location registration message, registers the location information of the AT 21 (S402), and transmits location registration acknowledge message to the corresponding PCF 23 for reporting weather the location information is registered to the PCF 23 or not. The Location Registration Acknowledge Message includes information indicating weather the IMSI of the AT 21 and location information of the AT 21 are registered.

Figure 5:
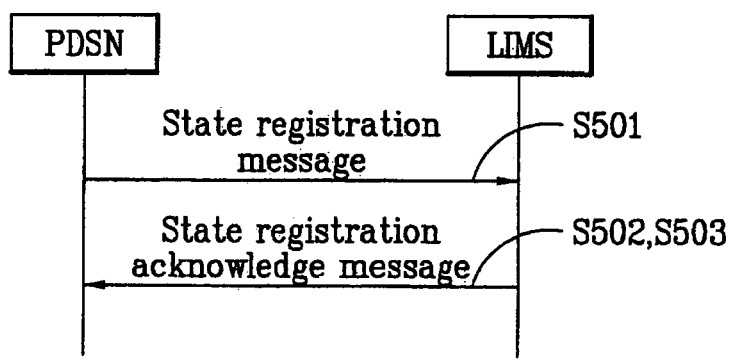
FIG. 5 is a flow diagram illustrating registration process of state information in FIG. 3.

Hereinafter, state information registration process among the location and state information registration process (S301) will be described referring to FIG. 5. FIG. 5 is a diagram showing state information registration process in FIG. 3.

Initially, the PDSN 24 loads state information of the corresponding AT 21 on the state registration message, and transmits the message to the corresponding LIMS 25 (S501) after receiving call state change information of the AT 21 or ending the PPP connection with the AT 21. Call state change of the AT 21 is divided into an active case, a dormant case and an idle case of the call state change of the AT 21. The state registration message includes the IMSI of the AT 21, the call state change (active/dormant/idle) of the AT 21, and the IP address of the AT 21.

The LIMS 25 receives the state registration message, registers (S502) state information of the AT 21, and transmits (S503) the State Registration Acknowledge Message to the corresponding PDSN 24 with added information indicating weather the state information is registered or not. The State Registration Acknowledge Message includes information indicating weather the IMSI of the AT 21 and location information of the AT 21 are registered.

Figure 6:
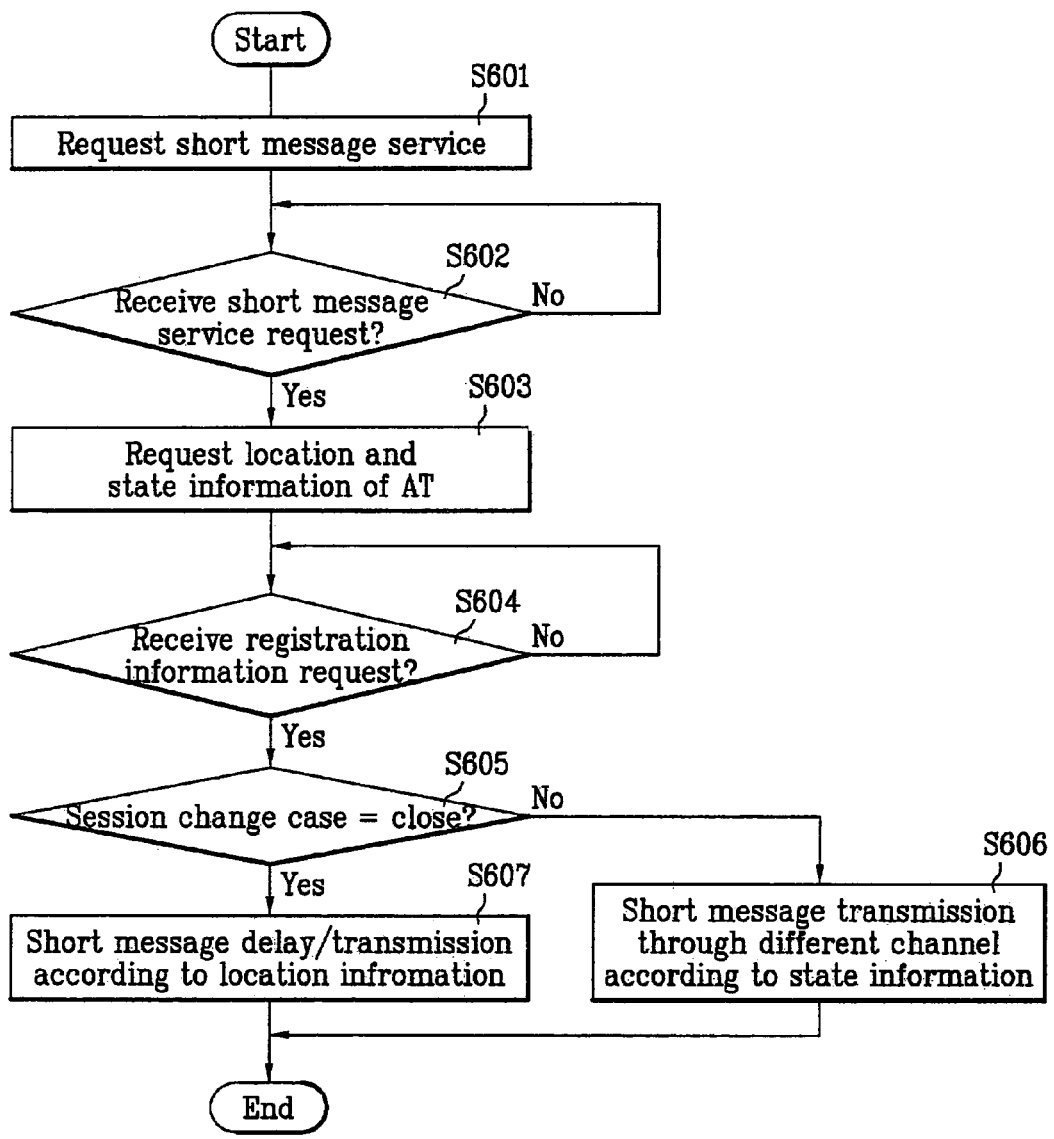
FIG. 6 is a diagram illustrating an order of short message delivery process in FIG. 3.

Hereinafter, the short message delivery process (S302) will be described referring to FIG. 6. FIG. 6 is a diagram showing an order of short message delivery process in FIG. 3.

Initially, the SME 27 requests (S601) a short message service by transmitting a SMS Request Message to the SMSC 26 for transmitting short message to an AT 21 having a predetermined IMSI. The SMS Request Message includes the IMSI of the AT 21 and short message data.

The SMSC 26 receives (S602) SMS Request Message of the SME 27 through the SMS Request Message, and requests (S603) location and state information of the AT 21 by transmitting Registration Information Request Message to the LIMS 25 to know the location and state of the AT 21. The Registration Information Request Message includes the IMSI of the AT 21.

Accordingly, the LIMS 25 receives requests of the SMSC 26 for location and state information of the AT 21 through the Registration Information Request Message, and decides (S605) session change case of the corresponding AT 21 according to the registered location information of the AT 21.

As a result of the decision (S605), if session change of the AT 21 is in open or handoff, the LIMS 25 decides call state change (active/dormant/idle) of corresponding AT 21 based on the registered state information of the AT 21, loads state information of the AT 21 corresponding to call state change on the Registration Information Report Message, and transmits to the SMSC 26.

On the other, hand, as a result of the decision (S605), if the session change case of the AT 21 is in 'close', the LIMS 25 loads the session close location information of the corresponding AT 21 on the Registration Information Report Message, and transmits to the SMSC 26. The corresponding SMSC 26 transmits (S607) the short message to the corresponding AT 21 after delaying the short message delivery according to the location information of the corresponding AT 21 when the session of the AT 21 is open. The Registration Information Report Message of the AT 21 includes IMSI of the AT 21 and session change case (close) of the AT 21.

Figure 7:
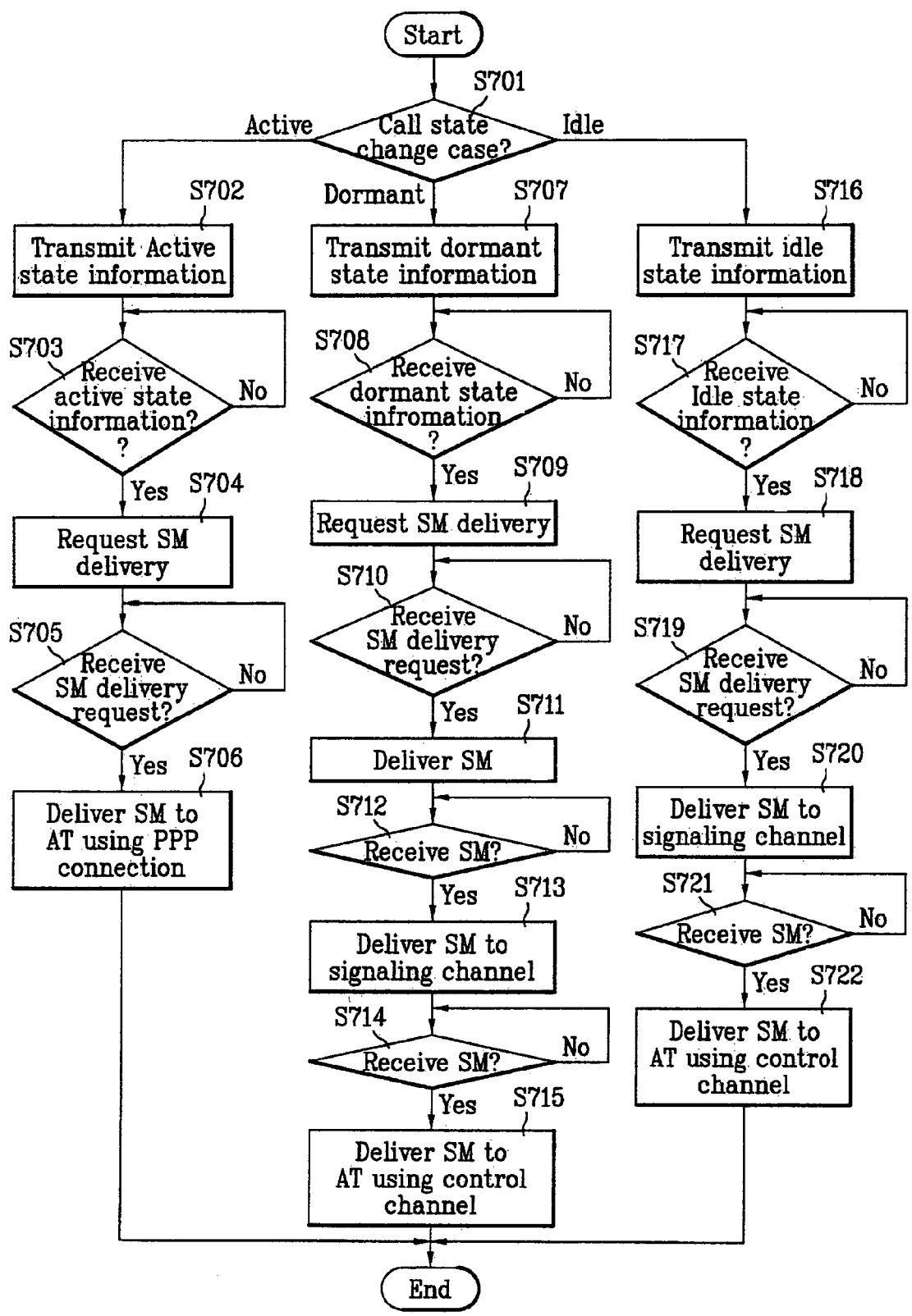
FIG. 7 is a diagram illustrating short message delivery process according to state information in FIG. 6.
Figure 8:
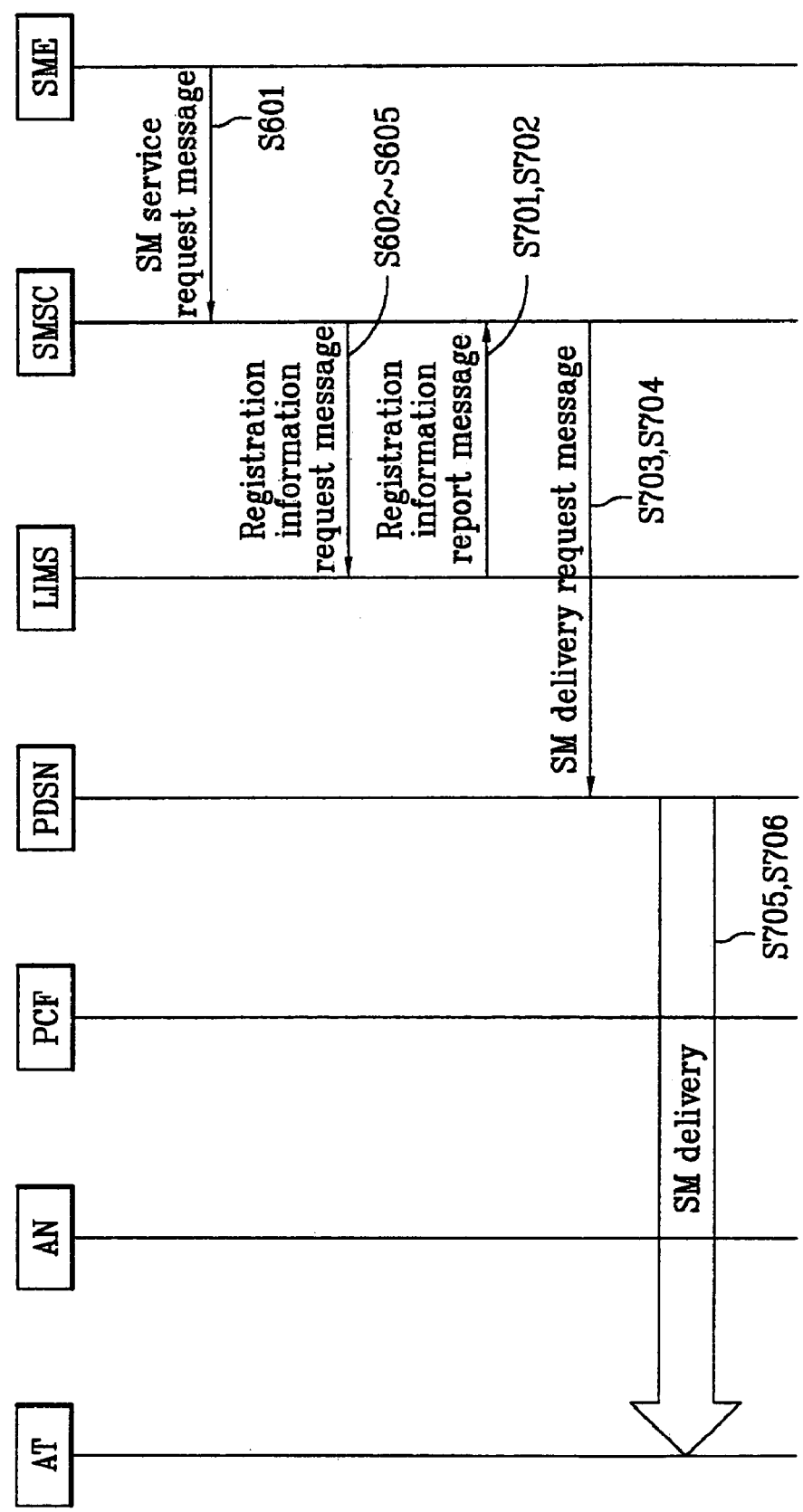
FIG. 8 is a diagram illustrating short message delivery process in active state in FIG. 7.
Figure 9:
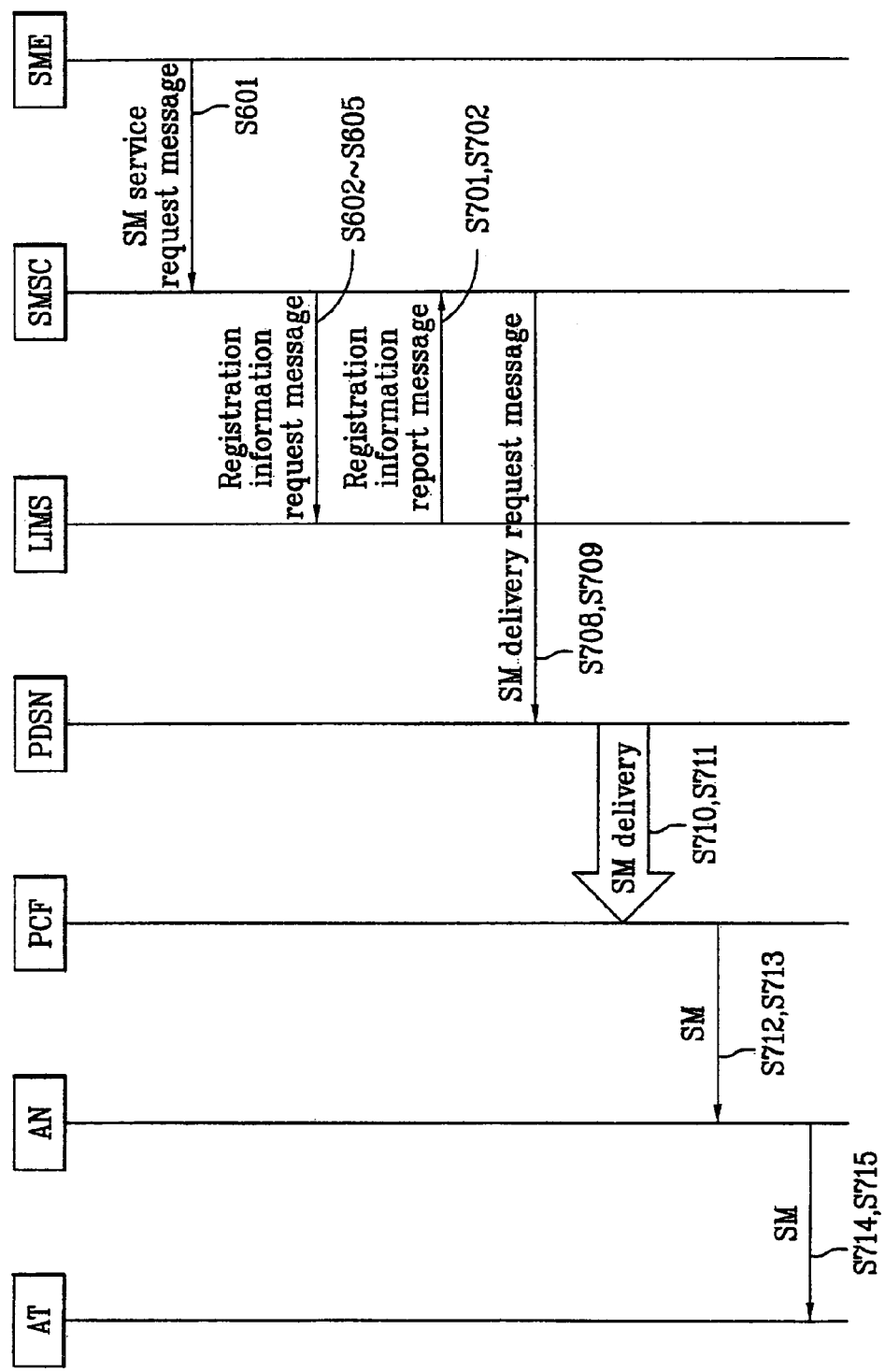
FIG. 9 is a diagram illustrating short message delivery process in dormant state in FIG. 7.
Figure 10:
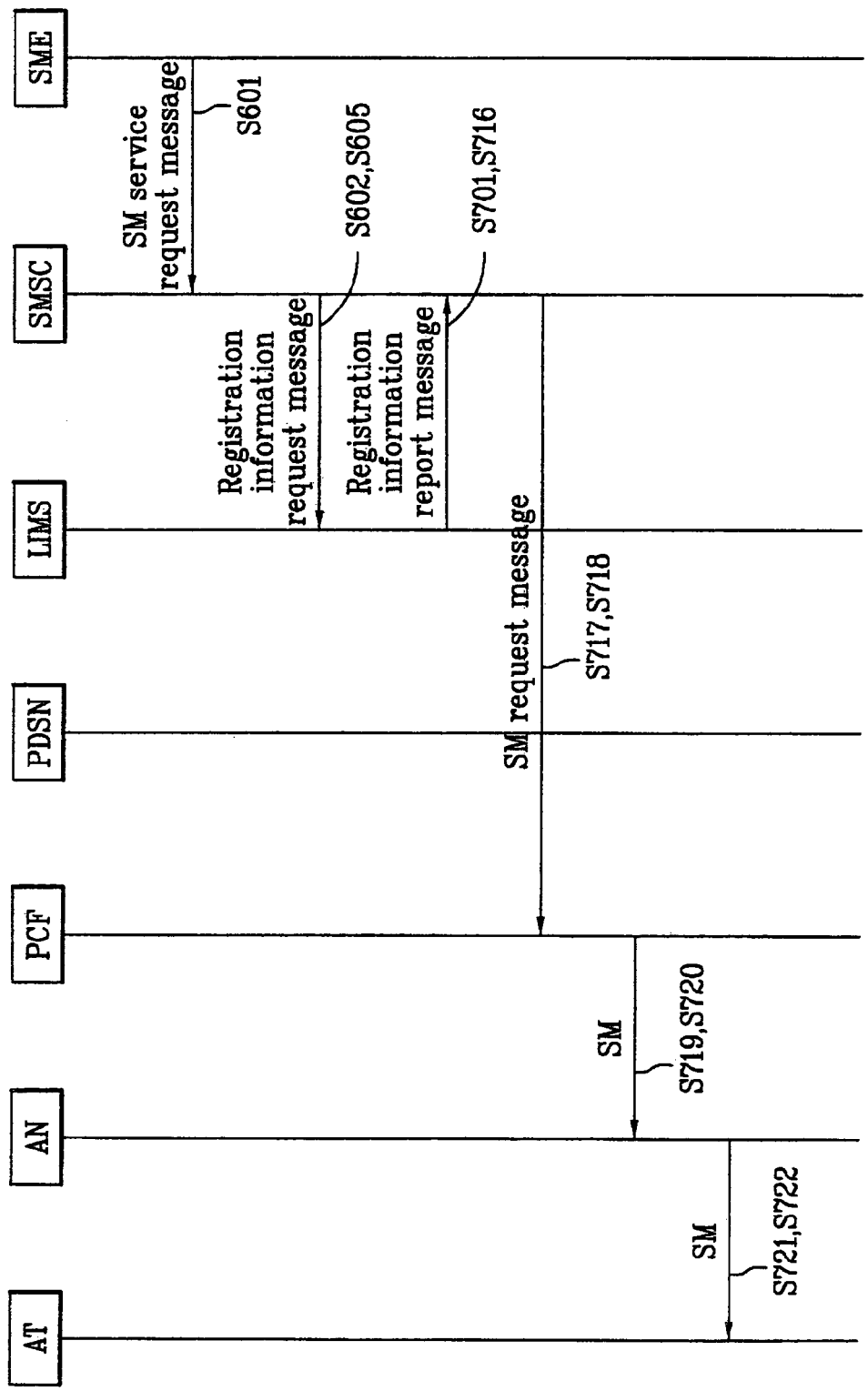
FIG. 10 is a diagram illustrating short message delivery process in idle state in FIG. 7.

Hereinafter, a short message delivery process (S606) according to state information of the AT will be described referring to FIG. 7, FIG. 8, FIG. 9 and FIG. 10. FIG. 7 is a diagram showing the short message delivery process (S606) according to state information of the AT in FIG. 6. FIG. 8 is a diagram showing a flow of the short message delivery process in active state in FIG. 7. FIG. 9 is a flow diagram showing the short message delivery process in dormant state in FIG. 8. FIG. 10 is a flow diagram showing the short message delivery process in idle state in FIG. 9.

Initially, as the result of the decision (S605), if session change case of the AT 21 is in open or handoff, the LIMS 25 decides (S701) call state change of the corresponding AT 21 according to the registered state information of the AT 21.

In this case, as a result of the decision (S701), if the call state change is in active, the LIMS 25 loads active state information of the AT 21 on the Registration Information Report Message, and transmits the message to the SMSC 26 as shown in FIG. 8. The Registration Information Report Message having active state information of the AT 21 includes the IMSI, the call state change (active) and the IP address of the AT 21.

The SMSC 26 receives (S703) active state information of the AT 21 through the Registration Information Report Message, and requests (S704) short message delivery to the AT 21 by transmitting a SM Delivery Request to the PDSN 24. The SM Delivery Request includes IMSI of the AT 21, the IP address of the AT 21 and short message data.

Accordingly, the PDSN 24 receives (S705) SM Delivery Request of the SMSC 26 through the SM Delivery Request, and transmits (S706) the short message to the corresponding AT 21 using the PPP connection with the AT 21 through a traffic channel. And the AT 21 outputs the short message to a user.

As shown in FIG. 9, as a result of the decision (S710), if the call state change of the AT 21 is in dormant case, the LIMS 25 loads dormant state information of the corresponding AT 21 on the Registration Information Report Message, and transmits (S707) the message to the SMSC 26. The Registration Information Report Message having the dormant state information of the AT 21 includes the IMSI, call state change and the IP address of the AT 21.

Hence, the SMSC 26 receives (S708) the dormant state information of the AT 21 through the Registration Information Report Message, and requests the SM Delivery to the AT 21 by transmitting the SM Delivery Request to the PDSN 24. The SM Delivery Request Message includes IMSI and the IP address of the AT 21.

Accordingly, the PDSN 24 receives (S710) the SM Delivery Request of the SMSC 26 through the SM Delivery Request Message, and transmits (S711) the SM to the PCF 23. The SM delivered to the PCF 23 includes IMSI of the AT 21 and short message data.

The PCF 23 receives (S712) the SM from the PDSN 24, search for UATI (Unicast Access Terminal Identifier) mapped with IMSI of the AT 21 included in the corresponding SM after confirming that a size of the SM data included in the corresponding SM can be transmitted using a signaling channel, and transmits (S713) the SM (SM_Page_PC2AN) to a AN 22. In this case, the SM transmitted through the signaling channel includes UATI and SM data.

Accordingly, the AN 22 receives (S714) SM transmitted through the signaling channel from the PCF 23, and transmits (S715) the SM (SM_Page_AN2AT) to the AT 21 using the control channel. Therefore, the AT 21 outputs the SM to the user.

As shown in FIG. 10, as the result of the decision (S701), if the call state change of the AT 21 is in idle, the LIMS 25 loads the idle state information on the Registration Information Report Message, and transmits (S716) the message to the SMSC 26. The Registration Information Report Message having the idle state information of the AT 21 includes IMSI, the call state change (idle) and the IP address of the AT 21.

The SMSC 26 receives (S717) the idle state information of the AT 21 through the Registration Information Report Message, and requests (S718) the SM delivery by transmitting the SM Delivery Request to the PCF 23. In this case, the SM Delivery Request Message includes IMSI and SM data of the AT 21.

The PCF 23 receives (S719) the SM Delivery Request of the SMSC 26 through the SM Delivery Request Message, searches for UATI mapped with IMSI of the AT 21 included in the corresponding SM after confirming that the SM data included in the corresponding SM is in transferable size using a signaling channel, and transmits (S720) the SM (SM_Page_PC2AN) to the AN 22. In this case, the SM transmitted through the signaling channel includes UATI and SM data.

Accordingly, the AN 22 receives (S721) the SM transmitted through the signaling channel from the PCF 23, and transmits (S722) the SM (SM_Page_AN2AT) to the AT 21 using the control channel. Hence, the AT 21 outputs the SM to the user.

Figure 11:
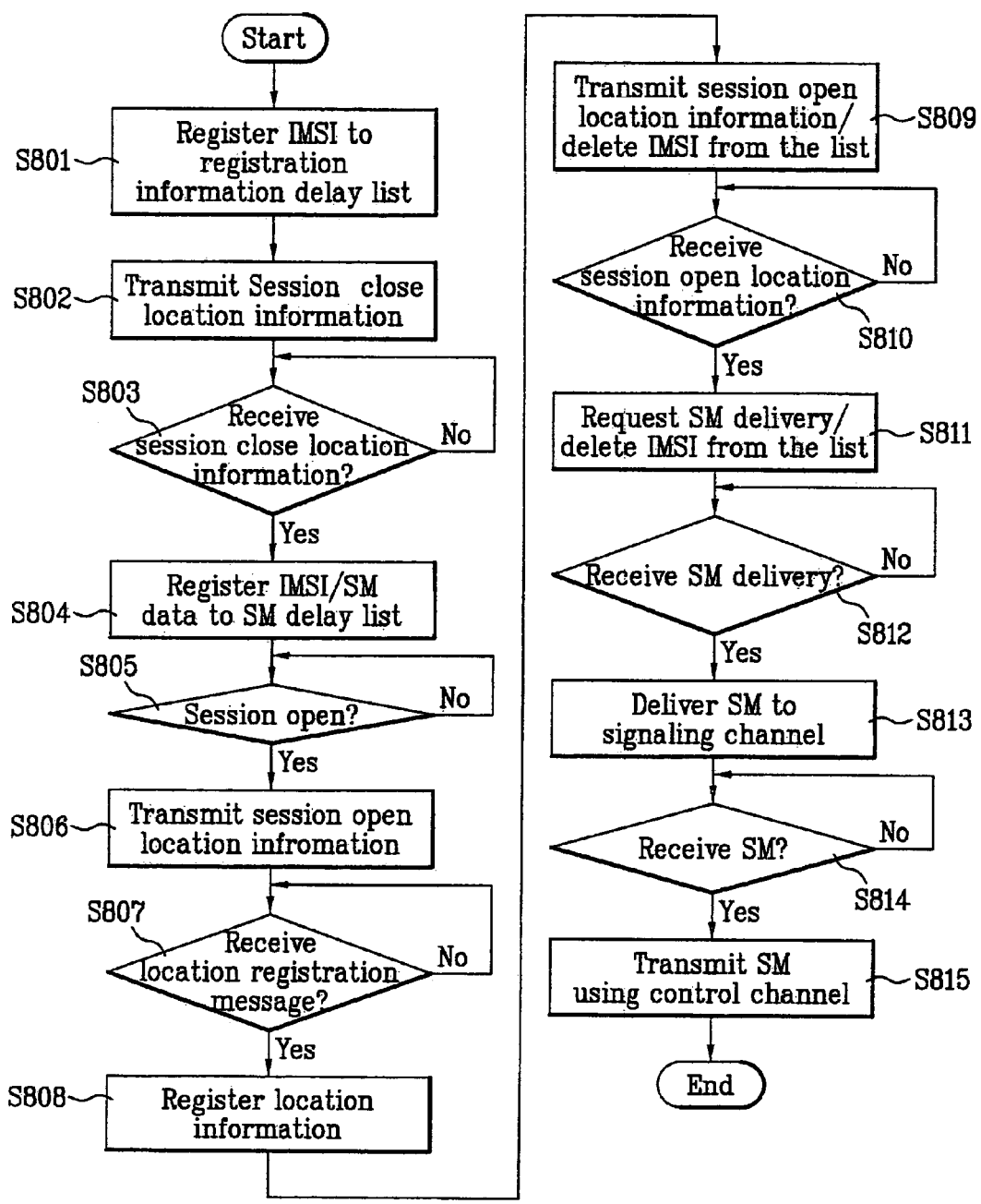
FIG. 11 is a diagram illustrating short message delay/delivery process according to location information in FIG. 6.
Figure 12:
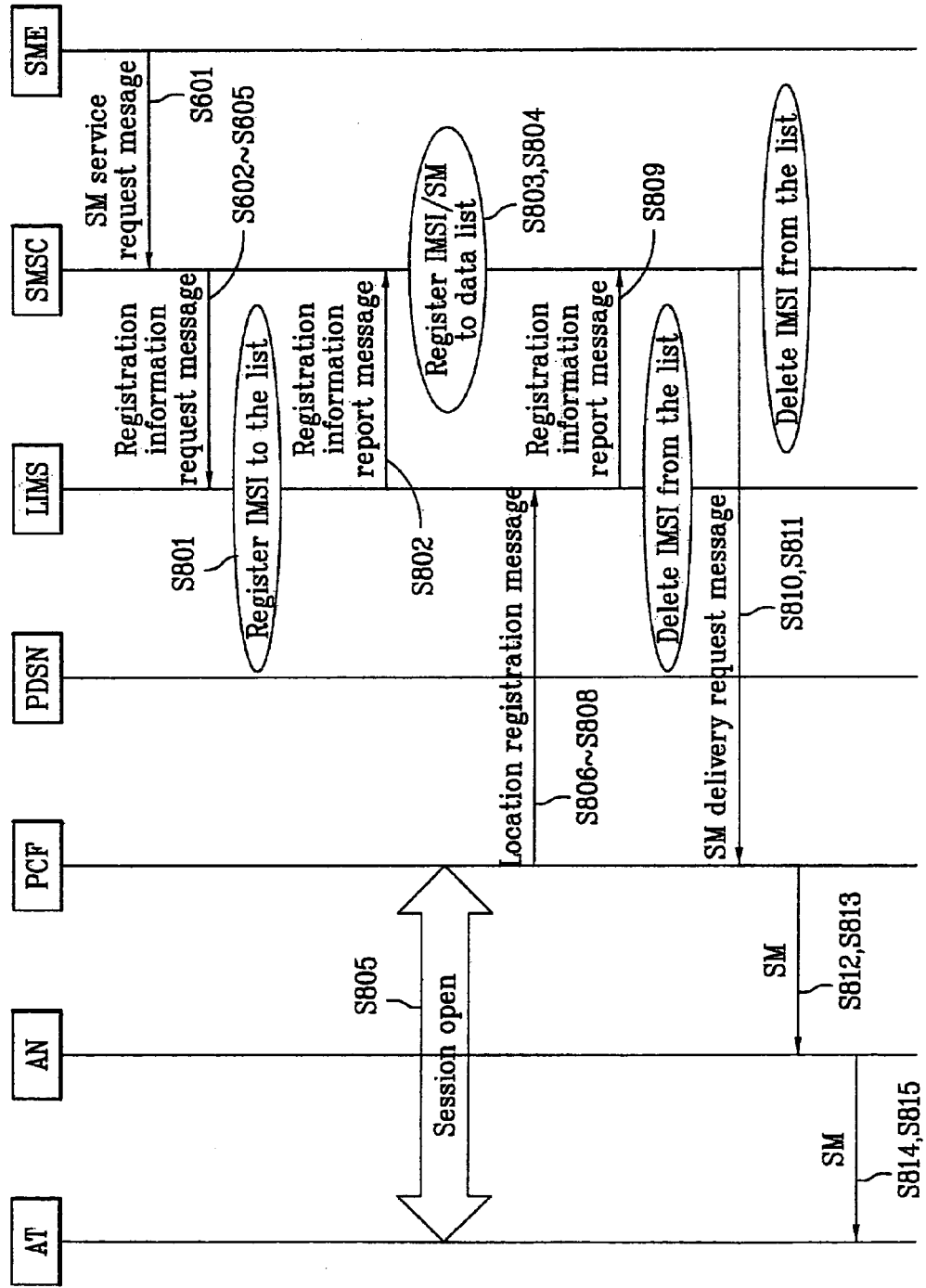
FIG. 12 is a flow diagram illustrating short message delay/delivery process in session close case in FIG. 11.

Meanwhile, the SM Delay/Deliver process (S607) according to the location information will be described referring to FIG. 11 and FIG. 12. FIG. 11 is a diagram showing an order of the SM Delay/Deliver process (S607) according to the location information in FIG. 6. FIG. 12 is a flow diagram showing the SM Delay/Deliver process in session close case in FIG. 11.

Initially, as the result of the decision (S605), if the session change case is in close case, the LIMS 25 registers (S801) IMSI of the corresponding AT 21 to a Registration Information Pending List when the corresponding session is closed, and location and state information are not registered to the DB.

And, the LIMS 25 loads the session close location information of the AT 21 on the Registration Information Report Message, and transmits (S802) the message to the SMSC 26. In this case, the Registration Information Report Message having the session close location information of the AT 21 includes IMSI of the AT 21 and the session change case (close) of the AT 21.

Accordingly, the SMSC 26 receives (S803) the session close location information of the AT 21 through the Registration Information Report Message, and registers (S804) IMSI of the corresponding AT 21 and the SM data on the Short Message Pending List.

When the session of the At 21 having IMSI registered to the Registration Information Delay List and SM Delay List is open (S805), the PCF 23 loads the corresponding session open location information on the Location Registration Message to report the session open location information of the At 21 to the LIMS 25, and transmits (S806) the message to the corresponding LIMS 25. In this case, the Location Registration Message having the session open location information of the AT 21 includes IMSI of the AT 21, the session change case of the AT 21 and an IP address of the PCF 23.

Therefore, the LIMS 25 receives (S807) the location Registration Message, and registers (S808) the location information of the AT 21 loaded on the corresponding Location Registration Message.

If IMSI of the AT 21 is in the Registration Information Delay List, the LIMS 25 loads the session open location information of the AT 21 on the report message, transmits to the SMSC 26, and deletes (S809) IMSI of the AT 21 from the Registration Information Delay List. In this case, the Registration Information Report Message having the session open location information of the At 21 includes IMSI of the AT 21, the session change case (open) and the IP address of the PCF 23.

The SMSC 26 receives (S810) the session open location information of the At 21 through the Registration Information Report Message, and if IMSI of the AT 21 is in the SM Delay List, requests SM Delivery in the SM Delay List to the AT 21 by transmitting the SM Delivery Request to the PCF 23, and deletes IMSI of the AT 21 from the SM Delay List. In this case, the SM Delivery Request Message includes IMSI of the AT 21 and SM data.

Thereupon, the PCF 23 receives (S812) the SM Delivery Request of the SMSC 26 through the SM Delivery Request Message, searches for UATI mapped with IMSI of the AT 21 included in the corresponding SM after confirming that the SM data included in the corresponding SM is in transferable size using a signaling channel, and transmits (S813) the SM (SM_Page_PC2AN) to the AN 22. In this case, the SM transmitted through the signaling channel includes UATI and SM data.

The AN 22 receives (S814) the SM transmitted through the signaling channel from the PCF 23, and transmits (S815) the short message (SM_Page_AN2AT) to the AT 21 using the control channel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As mentioned above, the present invention provides short message services using the HRPD system. The present invention serves the short message when the session between the terminal and the PCF is open not only in active state where the traffic channel is allocated to the terminal but also in dormant state or idle state. In dormant or idle state, the short message is provided without reactivation process for reallocating wireless resources.

What is claimed is:

1. A system for serving short messages in a high rate packet data system from a short message entity to a terminal, comprising:

a SMSC (Short Message Service Center) for transmitting the short message;

a LIMS (Location Info. Management Server) for registering and managing location and state information of the terminal, and providing the information to the SMSC;

a PDSN (Packet Data Service Node) for reporting state information of the terminal to the LIMS; and a PCF (Packet Control Function) for reporting location information of the terminal to the LIMS and providing call state change information of the terminal to the PDSN, wherein the PDSN reports the state information of the terminal to the LIMS according to the call state change of the terminal after receiving the call state change information of the terminal from the PCF, or after ending PPP connection with the terminal.

2. The system for serving short message in high rate packet data system in claim 1, wherein the short message is transmitted to the terminal by the short message service center working together with the LIMS, PDSN and PCF if the short message service center receives a SM Delivery Request from the short message entity.

3. The system for serving short message in high rate packet data system in claim 1, wherein the PCF reports location information of the terminal according to a session change case of the terminal to the LIMS.

4. The system of claim 1, wherein the SMSC transmits the short message to the terminal in SMS format based on the location and state information registered in the LIMS.

5. A system for serving short messages in a high rate packet data system from a short message entity to a terminal, comprising:
 a SMSC (Short Message Service Center) for transmitting the short message;
 a LIMS (Location Info. Management Server) for registering and managing location and state information of the terminal, and providing the information to the SMSC;
 a PDSN (Packet Data Service Node) for reporting state information of the terminal to the LIMS; and
 a PCF (Packet Control Function) for reporting location information of the terminal to the LIMS and providing call state change information of the terminal to the PDSN, wherein the LIMS manages an Internet Protocol address of the terminal and an IP address of the PCF reporting the location information of the terminal to the LIMS when the LIMS registers and manages the location information of the terminal.

6. A method for serving short messages in high rate packet data system from a short message entity to a terminal, comprising:
 receiving information of the terminal and registering the information to a LIMS (Location Info. Management Server); and
 transmitting short messages to the terminal using registered information of the terminal, wherein registering the information to the LIMS comprises:
 transmitting location information of the corresponding terminal from a PCF (packet control function) to the LIMS according to session change case of the terminal; and
 registering the location information of the terminal to the LIMS, wherein the PCF further transmits an IMSI (International Mobile Station Identity) of the terminal with information indicating the session change case of the terminal and an IP address of the PCF to the LIMS during the terminal information registration process.

7. A method for serving short messages in a high rate packet data system, comprising:
 receiving information of the terminal and registering the information to an LIMS (Location Info. Management Server); and
 transmitting short messages to the terminal using registered information of the terminal, wherein registering the information to the LIMS comprises:
 transmitting location information of the corresponding terminal from a PCF (packet control function) to the LIMS according to a session change case of the terminal;
 registering the location information of the terminal to the LIMS;
 transmitting state information of the corresponding terminal in a PDSN (Packet Data Service Node) to the LIMS according to the call state change of the terminal; and
 registering the state information of the terminal to the LIMS, wherein the PDSN further transmits an IMSI of the terminal with the session change case of the terminal and an IP address of the terminal to the LIMS during the terminal information registration process.

8. A method for serving short messages in a high rate packet data system to a terminal, comprising:
 receiving information of the terminal and registering the information to a LIMS (Location Info. Management Server); and
 transmitting a short message to the terminal using registered information of the terminal, said transmitting including:
 transmitting a request for short message service from a short message entity to a short message service center;
 transmitting a request for location and state information from the short message service center to the LIMS;
 deciding a session change case of the terminal based on information from the LIMS;
 transmitting state information of the terminal to the SMSC (Short Message Service Center) when the session change case is open or corresponds to a time of handoff; and
 transmitting the short message to the terminal using a different channel according to the corresponding state information, and wherein the short message serving method further comprises:
 transmitting session close location information of the terminal from the LIMS to the SMSC when the session change case is in close; and
 delaying delivery of the short message according to the location information of the terminal, and transmitting the short message to the terminal when the session of the terminal is open.

9. A The method for serving short messages in high rate packet data system to a terminal, comprising:
 receiving information of the terminal and registering the information to a LIMS (Location Info. Management Server); and
 transmitting a short message to the terminal using registered information of the terminal, said transmitting including:
 transmitting a request for short message service from a short message entity to a short message service center;
 transmitting a request for location and state information from the short message service center to the LIMS;
 deciding a session change case of the terminal based on information from the LIMS;
 transmitting state information of the terminal to the SMSC (Short Message Service Center) when the session change case is open or corresponds to a time of handoff; and
 transmitting the short message to the terminal using a different channel according to the corresponding state information, wherein transmitting the short message to the terminal using the different channel according to the state information comprises:
 deciding, in the LIMS a call state change of the terminal;
 transmitting the short message from the LIMS to the short message service center when the call state change is active;
 transmitting a request for short message delivery to the terminal from the SMSC to the PDSN (packet data service node); and
 transmitting the short message from the packet data service node to the terminal using a traffic channel.

10. A The method for serving short messages in high rate packet data system to a terminal, comprising:
- receiving information of the terminal and registering the information to a LIMS (Location Info. Management Server); and
- transmitting a short message to the terminal using registered information of the terminal, said transmitting including:
- transmitting a request for short message service from a short message entity to a short message service center;
- transmitting a request for location and state information from the short message service center to the LIMS;
- deciding a session change case of the terminal based on information from the LIMS;
- transmitting state information of the terminal to the SMSC (Short Message Service Center) when the session change case is open or corresponds to a time of handoff; and
- transmitting the short message to the terminal using a different channel according to the corresponding state information, wherein transmitting the short message to the terminal using the different channel according to the state information comprises:
- deciding a call state change of the terminal;
- transmitting dormant state information from the LIMS to the short message service center when the call state change of the terminal is dormant;
- requesting short message delivery to the terminal from the short message service center to the packet data service node;
- transmitting the short message from a packet data service node to a packet control function (PCF corresponding to the terminal;
- transmitting the short message from the PCF that received the short message to an access network corresponding to the terminal through a signaling channel; and
- transmitting the short message from the access network that received the short message transmitted through the signaling channel to the terminal using a control channel.

11. A The method for serving short messages in high rate packet data system to a terminal, comprising:
- receiving information of the terminal and registering the information to a LIMS (Location Info. Management Server); and
- transmitting a short message to the terminal using registered information of the terminal, said transmitting including:
- transmitting a request for short message service from a short message entity to a short message service center;
- transmitting a request for location and state information from the short message service center to the LIMS;
- deciding a session change case of the terminal based on information from the LIMS; transmitting state information of the terminal to the SMSC (Short Message Service Center) when the session change case is open or corresponds to a time of handoff; and
- transmitting the short message to the terminal using a different channel according to the corresponding state information, wherein transmitting the short message to the terminal using the different channel according to the state information comprises:
- deciding a call state change of the terminal;
- transmitting idle state information from the LIMS to the short message service center when the call state change is idle;
- requesting short message delivery to the terminal from the short message service center to a packet control function (PCF) corresping to the terminal;
- transmitting the short message from the PCF to an access network corresponding to the terminal through a signaling channel; and
- transmitting the short message from the access network that received the short message transmitted through the signaling channel to the terminal using the control channel.

12. A method for serving short messages in high rate packet data system to a terminal, comprising:
- receiving information of the terminal and registering the information to a LIMS (Location Info. Management Server); and
- transmitting a short message to the terminal using registered information of the terminal, said transmitting including:
- transmitting a request for short message service from a short message entity to a short message service center;
- transmitting a request for location and state information from the short message service center to the LIMS;
- deciding a session change case of the terminal based on information from the LIMS;
- registering an IMSI of the terminal from the LIMS to a registration information delay list when the session change case of the terminal is close;
- transmitting session close location information from the LIMS to the short message service center; and
- registering the IMSI of the terminal and the short message data from the short message service center to a short message delay list.

13. The method for serving short messages in high rate packet data system in claim 12, further comprising:
- transmitting session open location information from a packet control function (PCF) to the LIMS when a session of the terminal having IMSI is open;
- registering location information of the terminal to the LIMS,
- transmitting the session open location information to the short message center if IMSI of the terminal is in the registration information delay list, and deleting the corresponding IMSI from the registration delay list;
- transmitting a request to deliver the short message to the terminal from short message service center that received the session open location information to the PCF corresponding to the terminal if the corresponding IMSI is in the short message delay list, and deleting the corresponding IMSI from the short message delay list;
- transmitting the short message from the PCF to an access network having the terminal through a signaling channel according to the short message delivery request; and
- transmitting the corresponding short message from the access network that received the short message transmitted through the signaling channel to the terminal using the control channel.

* * * * *